Dec. 12, 1950 R. P. LEAVITT ET AL 2,533,481
AUTOMATIC CONTACT PRINTER
Filed Jan. 8, 1947 3 Sheets-Sheet 1
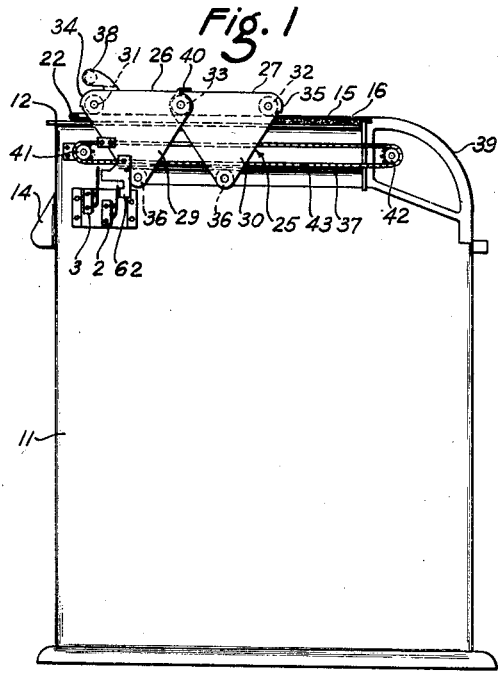
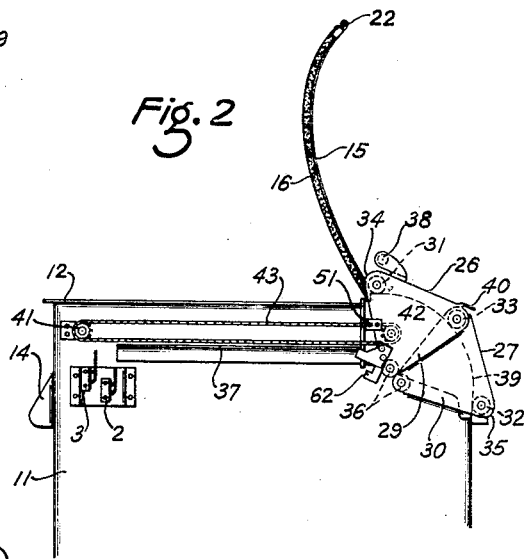
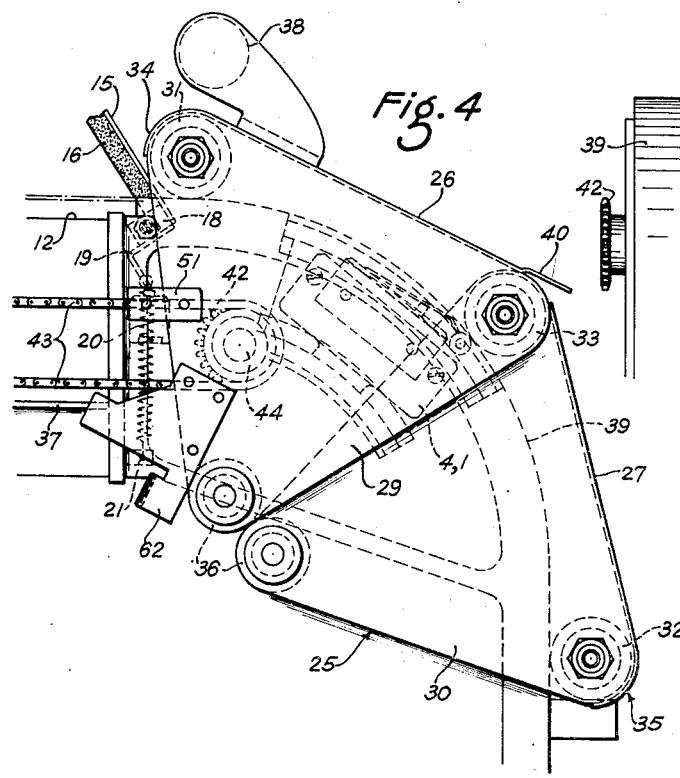
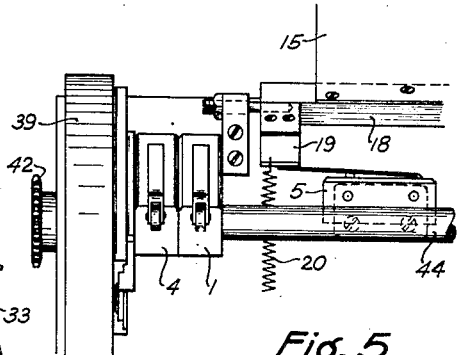
Roger P. Leavitt
William M. White
INVENTORS
BY
ATTORNEYS

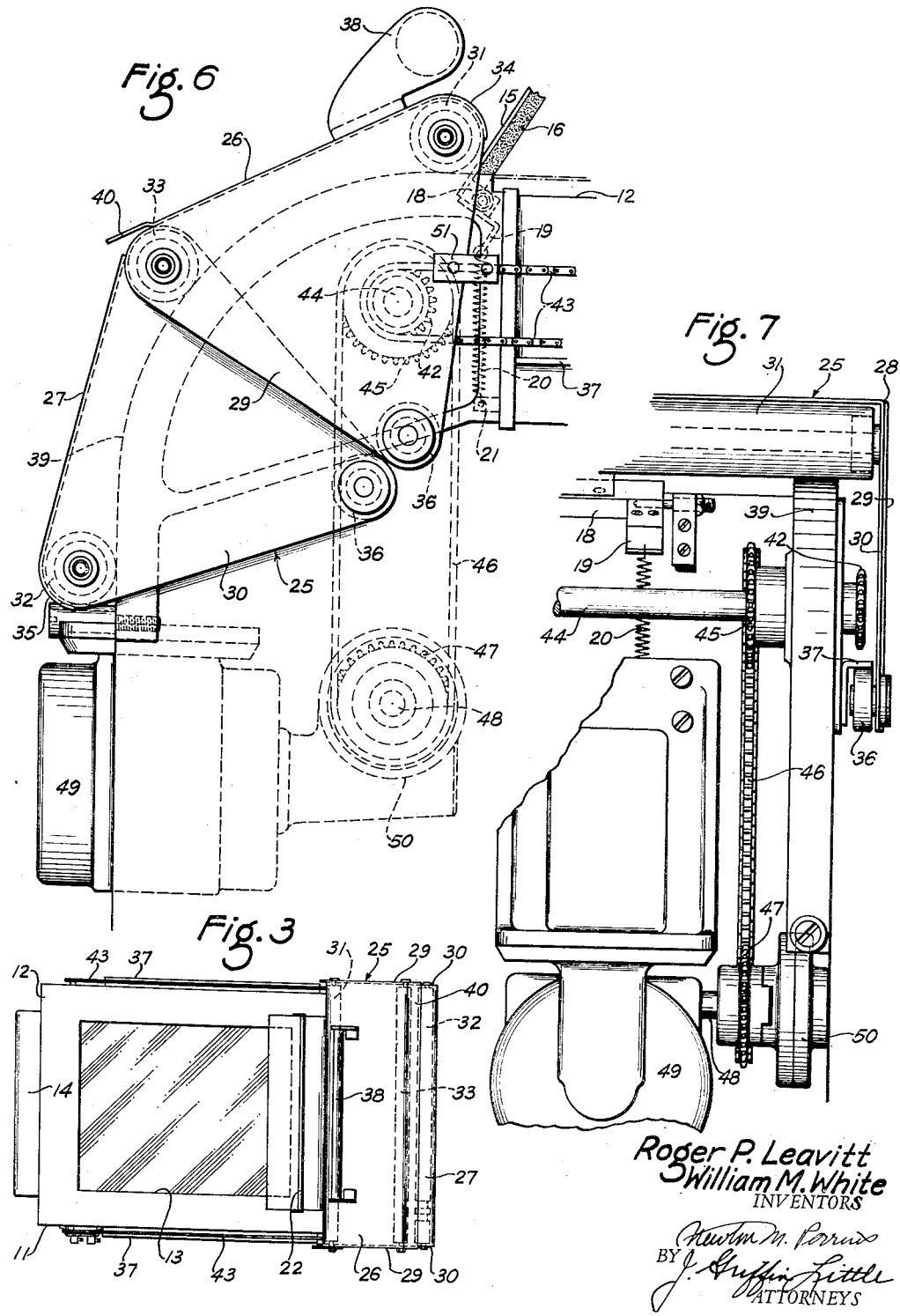

Dec. 12, 1950 R. P. LEAVITT ET AL 2,533,481
AUTOMATIC CONTACT PRINTER
Filed Jan. 8, 1947 3 Sheets-Sheet 3

Roger P. Leavitt
William M. White
INVENTORS
BY
ATTORNEYS

Patented Dec. 12, 1950

2,533,481

UNITED STATES PATENT OFFICE 2,533,481

AUTOMATIC CONTACT PRINTER

Roger P. Leavitt and William M. White, Rochester, N. Y., assignors to Eastman Kodak Company, Rochester, N. Y., a corporation of New Jersey Application January 8, 1947, Serial No. 720,866

17 Claims. (Cl. 95—73)

The present invention relates to photography, and more particularly to contact printers.

The principal object of the invention is the provision of a novel device for retaining the negative and sensitized paper or sheet in proper position over the printing aperture.

A further object of the invention is the provision of a platen moving means which serves to roll the platen down evenly and smoothly onto the sensitized paper or sheet without causing the latter to slip or move relative to the negative and to provide the desired contact between the negative and the sensitized material.

A still further object of the invention is the provision of various electric controls which are actuated and/or controlled by the platen and its moving means.

To these and other ends, the invention resides in certain improvements and combinations of parts, all as will be hereinafter more fully described, the novel features being pointed out in the claims at the end of the specifications.

In the drawings:

Fig. 1 is a side view of a printer, showing the relation of the platen and moving means constructed in accordance with the present invention and also showing two of the control switches;

Fig. 2 is a partial side view of the upper part of the printer, showing the platen in its elevated position, and the platen carriage in its retracted or inoperative position;

Fig. 3 is a plan view of the structure shown in Fig. 2;

Fig. 4 is a side view of a portion of the printer illustrated in Fig. 2, but on a larger scale than the latter, showing details of the platen elevating mechanism, and the construction of the platen carriage and a drive means therefor;

Fig. 5 is a right end elevation view of the upper left part of the printer shown in Fig. 1, showing the arrangement of three of the control switches;

Fig. 6 is a view similar to Fig. 4 but taken from the other side of the printer;

Fig. 7 is a right end elevation view of the right portion of the printer illustrated in Fig. 1, but on a larger scale than the latter, showing the drive motor and the drive means for the carriage, as well as the carriage positioning means;

Similar reference numerals throughout the various views indicate the same parts.

Figure 8:
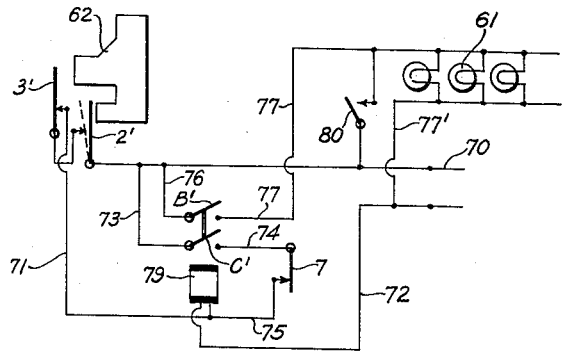
Fig. 8 is a wiring diagram of the printer when only a timer is used, and the printer is hand operated.

Fig. 1 shows a printer which comprises a housing 11, the top 12 of which is provided with a printing aperture 13 over which the negative and sensitive paper or material are to be placed, as is well known. The front of the housing is provided with a panel 14 on which various controls and switches, to be later described, may be mounted. The housing has positioned therein the means by which the sensitized material may be exposed, such means comprising a plurality of light bulbs arranged in parallel with a separate switch for each bulb, as shown diagrammatically in Fig. 9. In the center of this light bank, a pilot light and switch are provided. This pilot light may be removed and a printing bulb substituted when special effects are desired. A master switch is provided for turning on all the lights except the pilot light. These various switches are carried by the panel 14 and are shown diagrammatically in Fig. 9 to which reference may be had for a complete wiring diagram. This diagram will be more fully discussed later on.

The negative and sensitized material are held in contact over the aperture 13 by a platen, generally indicated by the numeral 15, which consists of a curved flexible metal sheet approximately .020 inch thick. On the convex or under side of the curved metal sheet is cemented a half-inch sheet 16 of "Airfoam" type of rubber with a sealed edge even with the metal sheet. The rear end of the platen is pivoted to a pivot bar 18 carried by the back of the housing 11 adjacent the top thereof, as clearly illustrated in Figs. 4 and 6. In use, the platen is moved downwardly to flatten it into a plane so as to engage and hold the material over the aperture 13 during the printing operation. It has been found, however, that if the pivot point of the platen is above the top 12, the lowering of the platen tends to slide the material in one direction, whereas if the pivot point is too far below the top, the platen tends to slide the material in the opposite direction when lowered to the operating position. Upon trial, it has been found that this sliding tendency could be avoided by placing the pivot point of the platen about one-quarter of an inch below the top 12, as shown in Figs. 4 and 6. The rear end of the platen has connected thereto an angle iron 19 to which is attached one end of a coil spring 20, the other end of which is anchored at 21 to the printer housing. This spring serves to move automatically the platen, when free, as will be later described, to its erected and inoperative position, as shown in Fig. 2. The front end of the platen has connected thereto a handle 22 by which the platen may be lowered, for the purpose to be later described.

The pritning may be accomplished by merely grasping the handle 22 to move the platen 15 to its operative position and substantially in the plane of the top 12 to hold firmly the film and sensitized material over the printing aperture. The printing light may then be turned on to make the exposure. It is preferred, however, to provide a means, such for example, as a movable carriage, generally indicated by the numeral 25, for moving the platen to and holding it in its operative position during the printing operation. This carriage is also utilized to operate and control the printing lights and various other mechanisms to be later more fully described in connection with Fig. 9.

This carriage 25 comprises a pair of flat plates 26 and 27, the opposite ends of which are bent down on lines 28 to provide triangular shaped end pieces 29 and 30 respectively, as shown in Figs. 1, 4 and 6. The upper front edges of the end pieces 29 and the upper rear edges of the pieces 30 have journaled therein rollers 31 and 32. The adjacent corners of the pieces 29 and 30 overlap and form bearings for an intermediate roller 33 which lies in the same plane as rollers 31 and 32. It will be apparent that the roller 33 affords a hinge connection between the plates 26 and 27 so that the latter and the rollers 31, 32, and 33 may be arranged in a plane during the printing operation, as shown in Fig. 1, or the plates may be pivoted about the roller 33 to move the plates and the rollers out of a plane when the carriage is in its inoperative position, as shown in Fig. 4, the purpose of which will be later described. The front edge 34 and the rear edge 35 of the plates 26 and 27 are bent over to form guards to prevent the operator from catching his fingers between the rollers 31, 32, and 33 and the top of the platen.

In order to hold the material in proper position over the aperture 13 during printing, the lower edge of each triangular piece 29 and 30 has mounted therein a roller 36. When the carriage is moved forward, each roller 36 engages under a flange 37 of an angle-iron the other flange of which is connected to the side of the housing 11, as clearly shown in Fig. 7. These flanges 37 provide tracks or guides for the rollers 36, and are so positioned as to cause the rollers 31, 32, and 33 to compress the layer of rubber 16 to about a quarter of an inch, and thus afford positioning means for the upper rollers 31, 32, and 33. The platen 26 is provided with a handle 38 for manually moving the carriage, as will be later explained. The travel of the carriage and rollers 31, 32, 33, and 36 is in a straight line until the carriage reaches a point immediately in back of the pivot bar 18. At this point, the lower roller 36 comes out from under the flange 37 and the upper rollers 31, 32, and 33 move off the printer top 12 and are picked up by a pair of spaced curved rails 39 which guide the rollers back and down behind the housing 11 to the position shown in Figs. 4 and 6. During the movement over the curved rails 39, the plates 26 and 27 pivot about the middle roller 33 so that the plates are no longer in a plane, as is apparent from an inspection of Figs. 4 and 6. When in the rearward postiion, the adjacent edges of the plates 26 and 27 are separated. In order to prevent injury to the operator when the carriage moves forward to bring these plates into a plane, this joint between the plates is closed by an extension 40 carried by the plate 26. See Figs. 4 and 6.

The apparatus above described may be operated manually by first placing the sensitized paper or material in position over the negative. The platen 15 may then be lowered by means of the handle 22, and the handle 38 may then be grasped to roll the carriage 25 forward from the inoperative position shown in Figs. 4 and 6 to its operable position shown in Fig. 1. During such movement, the rollers 31, 32, and 33 compress the rubber layer 16 to retain the material and negative securely in position over the aperture. The lights may then be turned on manually and the printing made, after which the lights may be turned off. Then the carriage may be slid backwardly to its inoperative position to free the platen. The latter is then raised automatically to its inoperative position shown in Fig. 2 by means of the spring 20.

Figure 9:
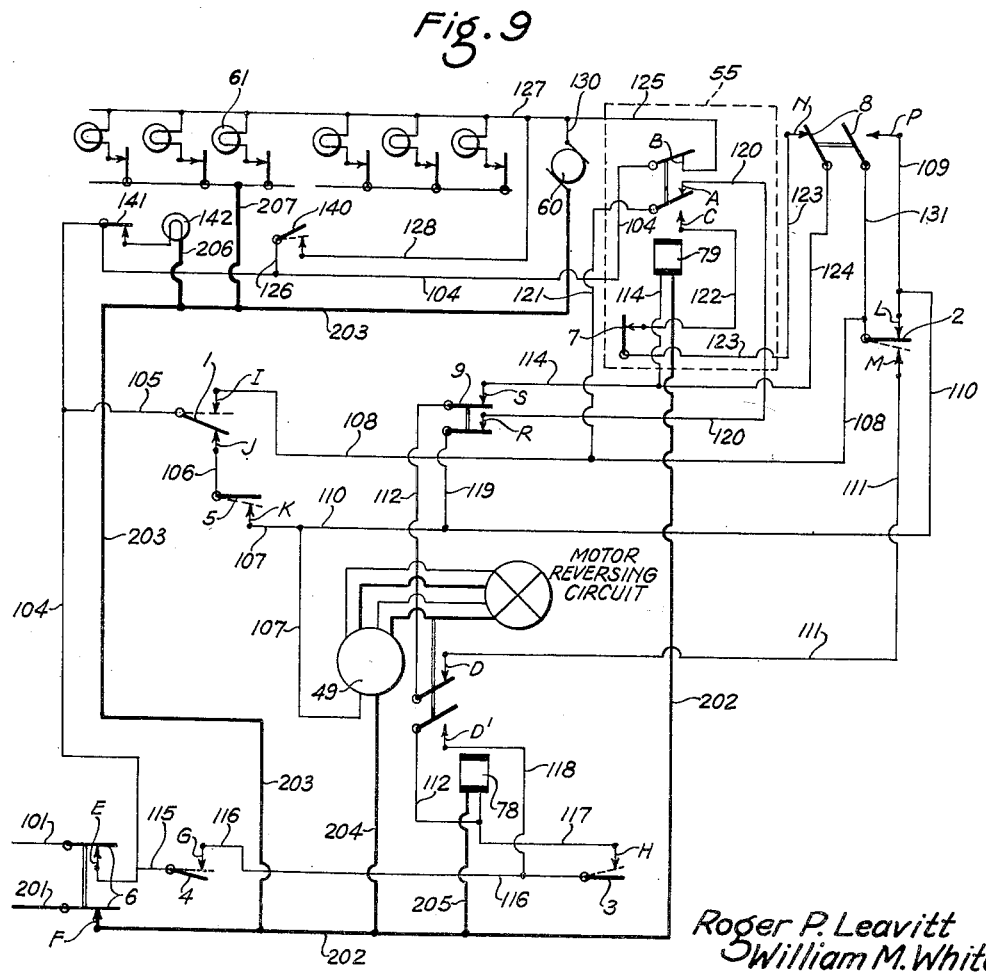
Fig. 9 is a wiring diagram when complete automatic control is provided for the printer.

It is preferred, however, to provide a power drive for the carriage and to utilize the platen and the moving carriage to operate and/or control the various electrical switches and circuits. To this end, each side of the housing 11, adjacent the top thereof, has mounted thereon a pair of spaced and aligned sprockets 41 and 42 over which an endless chain 43 is wrapped, as best shown in Fig. 1. The front sprockets 41 are idlers, but the rear sprockets 42 are pinned or otherwise connected to a jack shaft 44 positioned at the rear of the cabinet and below the top 12. This jack shaft carries a sprocket 45 connected by an endless chain 46 to a sprocket 47 connected to the shaft 48 of a motor 49 through a clutch, broadly designated by the numeral 50. This clutch permits the driving of the jack shaft in either direction, but does not constitute a part of the present invention. This clutch is, however, fully described and claimed in the applicant's application, Serial No. 731,233, filed February 27, 1947. Thus, the chain 43 may be driven in either direction by the motor 49. In order that such movement of the chains may be utilized to move the carriage, the latter has the front edge of each triangular end portion 29 pinned or otherwise secured at 51 to the chains so the carriage will move forwardly and backwardly as a unit with the chains 43. A reversing relay 78 is positioned above and in the circuit of the motor 49 and is adapted to reverse the motor polarity so that the motor may alternately rotate in opposite directions to move the carriage into and out of operative position. The wiring of the motor 49 and the relay 78 are shown in Fig. 9 and will be later discussed.

The operation of the motor driven carriage and the various controls will now be discussed in connection with Fig. 9 to which reference should now be had. This reference shows a main switch 6 which cuts off all power to the machine, this switch being connected to a suitable source of power, not shown. The common ground circuit 201 passes through the main switch 6 and contact F along 202, branching off at 204 to main motor 49 and at 205 to motor reversing relay 78, and continuing on 202 to timer relay 79. Another lead from the line 202 is 203, with branches at 206 to pilot light 142, and 207 to the main bank of light bulbs 61. The return for the pilot light is through switch 141, line 104, switch E to the line 101. The line 203 continues to the clock motor 60. The heavy lines 202 and 203 are the common ground for all the elements of the printer and will not be referred to later.

This wiring diagram shows the relative positions of all the switches and relays when the printer parts are in their inoperative position and ready to run, as shown in Figs. 2, 4, and 6. The negative and the sensitized material are then placed in proper position over the printing aperture 13. "Micro-switch" 5, which is operated by the angle-iron 19, Fig. 5, is actuated by moving the curved platen downwardly, and assumes the position indicated by the dotted line, Fig. 9, making contact at K. This completes the circuit to the motor 49, starting at 101 to contact E of main switch 6, through line 104, branching off at 105, through contact J of "Micro-switch" 1, down through 106, contact K of switch 5 through 107 to motor 49, which is in a forward driving relation and starts moving the carriage forward, as above described. "Micro-switches" 1 and 4 are located at the back of the cabinet or housing, the "Micro-switches" 2 and 3 are located at the front of the cabinet, as shown in Figs. 1 and 5 respectively. As soon as the carriage 25 starts forward, switch 1, which has been held in its solid line position by the backward position of the carriage, now assumes its dotted line position, making contact at I. This breaks the first circuit for the motor through switch 5, but now sends power to the motor through 101, contact E, 104, 105, contact I, line 108, contact L of the "Micro-switch" 2, 109, back on 110 to 107 and to the motor 49. This routing of the power to the motor is so that the motor may be shut off at the front end of the printer even though the "Micro-switch" 5 remains closed.

With the forward start of the carriage, the "Micro-switch" 4 moves to its closed position, as shown in dotted lines, but actuates nothing, as there is an open circuit still in the line 116, switch 3 being in its open position. The motor 49 also is receiving power through the timer 55, which takes power from line 108 by means of line 121 through contact A of the timer relay 79, down line 120, through contact R of the timer cutout switch 9, down line 119 to 110, and line 107 to the motor. The timer 55 is shown diagrammatically in Fig. 9 and does not, per se, constitute a part of the present invention. The timer herein illustrated is of the construction shown in the applicant's copending application No. 699,225, filed September 25, 1946, to which reference may be had. It is believed, however, that the diagrammatic illustration will be sufficient to those familiar with timers to understand the present invention. This timer is manually adjusted for a pre-selected printing time by adjusting the timer switch No. 7, Fig. 9, as explained in said application 699,225.

As the carriage completes its forward run, an operating plate 62 carried by the end 29 and of the shape best shown in Figs. 1 and 8 first actuates "Micro-switch" 2 into the position indicated by the dotted line, shown in Fig. 9. This breaks the circuit through the contact L to the motor so that if the timer cut-out switch 9 is also open, the power to the motor 49 will be cut off. In case the timer 55 is being used and the timer cut-out switch 9 is closed, the motor continues to obtain power from contact A in the timer relay 79 until the making of contact M in switch 2 at which time power is supplied to the relay 79 through line 111 and contact D in the motor reversing relay 78, through 112 to contact S of the timer cut-out switch 9, through 114 to timer relay 79, energizing this relay. This causes contact at A to be broken and to cut off the power to the motor 49. A very slight travel further forward of the carriage closes "Micro-switch" 3 and contact H. This energizes the motor reversing relay 78 which obtains its power from line 101, contact E in main switch 6, 115 contact G in the "Micro-switch" 4 which is in a closed position, line 116 to contact H, switch 3, and back on 117 to the motor reversing relay 78. This energizing the relay 78 and breaks contact at D, and makes contact at D', first breaking the circuit that energizing the timer relay 79 so that on completion of the timing cycle the timer 55 will not repeat itself, and second making contact at D' in the motor reversing relay 78 that takes power from line 116 up through 118, contact D', and back to 112 to self-energize the motor reversing relay 78. The closing of the motor reversing relay 78 also changes the polarity of the motor 49 by any of the well-known reversing circuits so that the next time the motor is energized, it will run so as to carry the carriage backwardly to its inoperative position, as shown in Figs. 2, 4, and 6.

For the momentary energizing of the timer relay 79, the making of contact at C self-energizes the timer relay 79 which through circuits 108, 121, contact C, 122, and the normally closed timer switch 7, line 123, to contact N of the push-button switch 8, back through 124 to 114, and thence to relay 79. Energizing the relay 79 also closes contact B so that the clock motor 60 is energized, obtaining its power from 101, contact E and switch 6, line 104, contact B in timer relay, back through 125 and 130 to the timer motor 60. Line 125 continues by the clock motor and joins 127 to supply power to the bank of lights 61. Upon completion of the pre-set time interval, the timer switch 7 is opened by the clock mechanism of the timer, not shown, and breaks the self-energizing circuit of the timer relay 79. This permits the relay to assume the position indicated in the drawing, which results in the opening of the contact B turning off the clock motor 60 and lamp bank 61, and then closing contact A which then supplies power to start the motor 49 for the return travel.

As the carriage moves back, micro-switches 2 and 3 assume the position indicated in solid line in Fig. 9, but the opening of contact H of switch 3 does not cause the opening of motor reversing relay 78 as the latter is self-energized and the closing of contact L of switch 2 furnishes a second source of supply of power to the motor 49. As the carriage completes its backward run, it first actuates "Micro-switch" 1 which assumes the solid line position indicated in Fig. 9, breaking the source of power to the motor through contact A in the timer relay 79, and contact L in switch 2 by the breaking of contact I which powers line 108, but sending power to the motor 49 through contact J in switch 5. At the same time, switch 4 is opened and breaks contact G in the self-energizing circuit of the motor relay 78 which opens this relay so that the motor will run forward next time it is energized. As the carriage completes the end of its rearward run, the curved platen 15 is freed so that it may be raised by its spring 20 and remove the pressure on switch 5 which now opens, permitting it to break the remaining power circuit to the motor through contact J, and the motor stops. The printer mechanism is now ready to repeat another cycle.

Should the timer cut-out switch 9 be thrown open breaking contacts R and S, the function of the mechanism differs in that the breaking of the contact L with the forward travel of the carriage now turns off the motor. The lamp bank is then controlled by the master switch 140 which supplies power to the bulbs 61 from 104 through 126, the master switch, 140, line 128, and 127. This master switch 140 can also be used any time for adjusting dodging material or negatives. Upon the completion of the desired printing time, which is now controlled manually and not by the timer 55, push button 8 is actuated and sends power to the motor 49 through lines 108, 131, contact P of the push button switch 8, line 109, to 110, and line 107 to the motor. When the carriage moves backward, switch 2 assumes the solid line position shown in Fig. 9, through contact L supplies power so that push button switch 8 need only to supply a momentary impulse to the motor. The mechanism operates from here on as previously described.

When the timer cut-out switch 3 is closed and the timer is controlling the return of the carriage, the function of the timer may be cut short of its completed pre-set run by the actuation of the push button switch 8 as this opens the contact N, breaking the self-energizing circuit of the timer relay 79, and at the same time completing power circuits to the motor through contact P in switch 8 and contact A in the timer energizing relay. This may be used if the wrong time interval is selected or the wrong type of paper should be discovered after the timing cycle is started. The pilot light switch 141 supplies power to the pilot light 142 and may be opened or closed as the operator desires.

In some instances, it may be desirable to manually operate the platen and carriage in connection with the pre-set timer. In such a case the simplified wiring diagram such as shown in Fig. 8 may be used. To secure this result, the two switches 2' and 3' are connected in series and are positioned in the path of the plate 62 carried by the front triangular end piece 29 of the carriage 25, switch 3' being in the closed position while switch 2' is in the normally open position. As the carriage 25 moves forward, the plate 62 engages and closes switch 2' to supply power from the line 79 through switch 2' and 3' to line 71 and timer relay 79 and line 72 to the other side of the circuit. This closes the circuit through the relay 79 and energizes the latter to move the armature thereof downwardly to close switches B' and C'. Further forward movement of the carriage finally brings the plate 62 into engagement with the switch 3' to open the main circuit through the relay 79. However, the relay is now self-energized through lines 70 and 73, switch C', line 74, pre-set timer switch 7, line 75, to line 79 and thence back to the return line 72. The lights 61 are energized through lines 70 and 76, switch B', line 77 to lights 61 and then through the return lines 77' to line 72. A master switch 80 similar to that shown in Fig. 9 may be used, if desired, to directly connect the line 70 to line 77' to illuminate the lamps while the timer circuit is open. Thus the timer mechanism can be used with the manually controlled platen and carriage without utilizing the various other controls described above.

The front panel 14 when used in connection with the completely automatic arrangement of the type illustrated in Fig. 9 has mounted thereon the master switch for the lamps 61, the main switch 6, the pilot light switch, the timer cut-out switch 9, the push-button switch 8, and the timer. With the simplified arrangement shown in Fig. 8, the timer and master switch for the lamp 61 may also be placed on the panel 14.

From the above description, it is apparent that the present invention provides a novel platen and carriage construction. Also, the downward movement of the platen initiates an operating cycle by which the carriage is automatically moved forward and backward, and the movement of the carriage is utilized to operate various switches to control the desired circuits and mechanisms.

While one embodiment of the invention has been disclosed, it is to be understood that the novel idea may be carried out in a number of ways. This application is, therefore, not to be limited to the precise details described, but is intended to cover all variations and modifications thereof falling within the scope of the appended claims.

We claim:

1. In a photographic printing machine having a top formed with a printing aperture, the combination of a curved flexible platen adapted to hold a sensitized sheet over said aperture, means for hingedly connecting one end of said platen to said top, a rolling carriage movable substantially in a plane and into engagement with said platen to flatten the latter into a plane to hold said sheet in position over said aperture, said carriage being movable to an inoperative position and out of contact with said platen, and spring means connected to said platen for moving the latter about said hinge to an elevated position when said carriage is moved to said inoperative position.

2. In a photographic printing machine having a top formed with a printing aperture, the combination, of a curved flexible platen hinged at one end to said top, a carriage movable across said top to engage said platen to flatten the latter into a plane over said aperture, said carriage comprising a plurality of hingedly connected plates, and platen engaging rollers carried by said plates and including a roller which provides a hinge between said plates.

3. In a photographic printing machine having a top formed with a printing aperture, the combination, of a curved flexible platen hinged at one end to said top, a carriage movable across said top to engage said platen to flatten the latter into a plane over said aperture, said carriage comprising a plurality of hingedly connected plates, platen engaging rollers carried by said plates, and roller means carried by said plates and engaging said machine to hold said first rollers in position to flatten said platen.

4. In a photographic printing machine having a top formed with a printing aperture, the combination of a self flexing platen hinged at one end to said top, a compressible member mounted on the under side of platen and adapted to engage and hold a sensitized sheet over said aperture, a rolling carriage comprising hingedly connected plates movable over said top and into engagement with said platen to move the latter into a plane and to compress said member, roller means carried by said plates, and means on said machine engaging said roller means to hold said carriage in positive engagement with said platen.

5. In a photographic printing machine having a top formed with a printing aperture, the combination of a self flexing platen hinged at one end to said top, a compressible member mounted on the under side of platen and adapted to engage and hold a sensitized sheet over said aperture, a carriage movable over said top and into engagement with said platen to move the latter into a plane and to compress said member, said carriage comprising a pair of plates, platen engaging rollers carried by said plates, one of said rollers connecting and providing a hinge between said plates, and roller means for holding said first rollers in position to compress said material.

6. In a photographic printing machine having a top formed with a printing aperture, the combination of a self flexing platen hinged at one end to said top, a compressible member mounted on the under side of platen and adapted to engage and hold a sensitized sheet over said aperture, a carriage movable over said top and into engagement with said platen to move the latter into a plane and to compress said member, said carriage comprising a pair of plates, platen engaging rollers carried by said plates, one of said rollers connecting and providing a hinge between said plates, means for holding said rollers in position to compress said material, and means for moving said platen automatically about its hinge to an elevated position and to allow said platen to flex when said carriage is moved out of holding relation with said platen.

7. In a photographic printing machine having a top formed with a printing aperture, the combination of a self flexing platen hinged at one end to said top, a compressible member mounted on the under side of platen and adapted to engage and hold a sensitized sheet over said aperture, a carriage movable over said top and into engagement with said platen to move the latter into a plane and to compress said member, said carriage comprising a pair of plates, platen engaging rollers carried by said plates, one of said rollers connecting and providing a hinge between said plates, turned down ends formed on said plates, a roller carried by each turned down end, and a guide on said machine adapted to be engaged by said latter rollers when said carriage is moved into engagement with said platen to maintain said first rollers in contact and in compressing relation with said platen.

8. In a photographic printing machine having a top formed with a printing aperture, the combination of a self-flexing platen hingedly connected at one end to said top, a carriage movable across said top and into engagement with said platen to press the latter into a plane over said aperture to retain a sensitized sheet in position thereover, said carriage comprising a pair of plates, platen engaging rollers carried by said plates, one of said rollers hingedly connecting said plates, means carried by said plates and cooperating with said machine for retaining said plates in a plane when the carriage is in platen engaging relation, said carriage being movable to an inoperative position and out of engagement with said platen, and means for guiding and supporting said plates when said carriage is moved to its inoperative position.

9. In a photographic printing machine having a top formed with a printing aperture, the combination of a self-flexing platen hingedly connected at one end to said top, a carriage movable across said top and into engagement with said platen to press the latter into a plane over said aperture to retain a sensitized sheet in position thereover, said carriage comprising a pair of plates, platen engaging rollers carried by said plates, one of said rollers hingedly connecting said plates, means carried by said plates and cooperating with said machine for retaining said plates in a plane when the carriage is in platen engaging relation, said carriage being movable to an inoperative position and out of engagement with said platen, means for guiding and supporting said plates when said carriage is moved to its inoperative position, and means to move said platen automatically to a raised position when said carriage is moved to its inoperative position.

10. In a photographic printing machine having a top formed with a printing aperture, the combination of a curved flexible platen adapted to hold a sensitized sheet over said aperture, means for hingedly connecting one end of said platen to said top, a carriage mounted on said machine and movable forwardly into engagement with said platen to flatten the latter into a plane to hold said sheet in position over said aperture, said carriage also being movable rearwardly to an inoperative position and out of contact with said platen to free the latter, means connected to said hinge for moving the freed platen about said hinge and to an elevated position, means for moving said carriage, and means operated by said carriage for controlling said moving means.

11. In a photographic printing machine having a top formed with a printing aperture, the combination of a curved flexible platen adapted to hold a sensitized sheet over said aperture, means for hingedly connecting one end of said platen to said top, a carriage mounted on said machine and movable forwardly into engagement with said platen to flatten the latter into a plane to hold said sheet in position over said aperture, said carriage also being movable rearwardly to an inoperative position and out of contact with said platen to free the latter, a motor operatively connected to said carriage to move the latter, a switch in the circuit of said motor, means for connecting said platen to said switch, said platen being manually movable toward said top to close said switch to energize said motor to move said carriage, and means for moving the freed platen away from said top to open said switch to stop said motor when said carriage is moved to its inoperative position.

12. In a photographic printing machine having a top formed with a printing aperture, the combination of a curved flexible platen adapted to hold a sensitized sheet over said aperture, means for hingedly connecting one end of said platen to said top, a carriage mounted on said machine and movable forwardly into engagement with said platen to flatten the latter into a plane to hold said sheet in position over said aperture, said carriage also being movable rearwardly to an inoperative position and out of contact with said platen to free the latter, a motor operatively connected to said carriage to move the latter, a switch in the circuit of said motor, means for connecting said platen to said switch, said platen being manually movable toward said top to close said switch to energize said motor to move said carriage forwardly, lamps mounted in said machine for illuminating said aperture, a switch in the circuit of said lamps for controlling the lamps, and means on said carriage for engaging said second switch when the carriage is moved completely forward to close said second switch to energize said lamps.

13. In a photographic printing machine having a top formed with a printing aperture, the combination of a curved flexible platen adapted to hold a sensitized sheet over said aperture, means for hingedly connecting one end of said platen to said top, a carriage mounted on said machine and movable forwardly into engagement with said platen to flatten the latter into a plane to hold said sheet in position over said aperture, said carriage also being movable rearwardly to an inoperative position and out of contact with said platen to free the latter, a motor operatively connected to said carriage to move the latter, a switch in the circuit of said motor, means for connecting said platen to said switch, said platen being manually movable toward said top to close said switch to energize said motor to move said carriage forwardly, lamps mounted in said machine for illuminating said aperture, a timer mechanism, a circuit for said timer and lamps, a control switch in said lamp and timer circuit, means controlled by said carriage for causing the closing of said control switch to energize said lamp and timer when said carriage approaches substantially its forward position, and means controlled by said carriage upon reaching its forward position for opening the circuit to said motor to stop the latter and for reversing the polarity of the motor.

14. In a photographic printing machine having a top formed with a printing aperture, the combination of a curved flexible platen adapted to hold a sensitized sheet over said aperture, means for hingedly connecting one end of said platen to said top, a carriage mounted on said machine and movable forwardly into engagement with said platen to flatten the latter into a plane to hold said sheet in position over said aperture, said carriage also being movable rearwardly to an inoperative position and out of contact with said platen to free the latter, a motor operatively connected to said carriage to move the latter, a switch in the circuit of said motor, means for connecting said platen to said switch, said platen being manually movable toward said top to close said switch to energize said motor to move said carriage forwardly, lamps mounted in said machine for illuminating said aperture, a timer mechanism, a circuit for said timer and lamps, a pre-set switch in said timer circuit for controlling the length of time of illumination of said lamps, and means controlled by said pre-set switch and operative at the end of said time to again complete the circuit to said motor to energize the latter to move said carriage backward.

15. In a photographic printing machine having a top formed with a printing aperture, the combination of a curved flexible platen adapted to hold a sensitized sheet over said aperture, means for hingedly connecting one end of said platen to said top, a carriage mounted on said machine and movable forwardly into engagement with said platen to flatten the latter into a plane to hold said sheet in position over said aperture, said carriage also being movable rearwardly to an inoperative position and out of contact with said platen to free the latter, a motor operatively connected to said carriage to move the latter, a switch in the circuit of said motor, means for connecting said platen to said switch, said platen being manually movable toward said top to close said switch to energize said motor to move said carriage forwardly, lamps mounted in said machine for illuminating said aperture, a timer mechanism, a circuit for said timer and lamps, a pre-set switch in said timer circuit for controlling the length of time of illumination of said lamps, a motor reversing relay in the motor circuit, a self energizing circuit for said timer including said pre-set switch so that upon completion of said time said self-energizing circuit will be opened, and means controlled by said carriage when the latter reaches its full forward position for closing the circuit to said reversing relay and for opening the control switch in said timer and lamp circuit so that said timer will then be energized through said self-energizing circuit.

16. In a photographic printing machine having a top formed with a printing aperture, the combination of a curved flexible platen adapted to hold a sensitized sheet over said aperture, means for hingedly connecting one end of said platen to said top, but slightly below the surface thereof, a carriage mounted on said machine and movable forwardly into engagement with said platen to flatten the latter into a plane to hold said sheet in position over said aperture and without slippage relative thereto, said carriage also being movable rearwardly to an inoperative position and out of contact with said platen to free the latter, a motor operatively connected to said carriage to move the latter, a switch in the circuit of said motor, means for connecting said platen to said switch, said platen being manually movable toward said top to close said switch to energize said motor to move said carriage forwardly, lamps mounted in said machine for illuminating said aperture, a timer mechanism, a circuit for said timer and lamps, a pre-set switch in said timer circuit for controlling the length of time of illumination of said lamps, a motor reversing relay in the motor circuit, a self-energizing circuit for said timer including said pre-set switch so that upon completion of said time said self-energizing circuit will be opened, means controlled by said carriage when the latter reaches its full forward position for closing the circuit to said reversing relay and for opening the control switch in said timer and lamp circuit so that said timer will then be energized through said self-energizing circuit, the opening of said pre-set switch at the end of said time serving to open said self-energizing circuit to said timer to disconnect said timer and lamps and to simultaneously energize said motor to move said carriage backward, and means controlled by said platen for opening the motor circuit to stop the movement of said carriage when the latter reaches its rearward position.

17. In a photographic printing machine having a top formed with a printing aperture, the combination of a curved flexible platen adapted to hold a sensitized sheet over said aperture, means for hingedly connecting one end of said platen to said top, but slightly below the surface thereof, a carriage mounted on said machine and movable forwardly into engagement with said platen to flatten the latter into a plane to hold said sheet in a non-slipping relation over said aperture, said carriage also being movable rearwardly to an inoperative position and out of contact with said platen to free the latter, a motor operatively connected to said carriage to move the latter, a switch in the circuit of said motor, means for connecting said platen to said switch, said platen being manually movable toward said top to close said switch to energize said motor to move said carriage forwardly, lamps mounted in said machine for illuminating said aperture, a timer mechanism, a circuit for said timer and lamps, a pre-set switch in said timer circuit for controlling the length of time of illumination of said lamps, a motor reversing relay in the motor circuit, a self-energizing circuit for said timer including said pre-set switch so that upon completion of said time said self-energizing circuit will be opened, means controlled by said carriage when the latter reaches its full forward position for closing the circuit to said reversing relay and for opening the control switch in said timer and lamp circuit so that said timer will then be energized through said self-energizing circuit, the opening of said pre-set switch at the end of said time serving to open said self-energizing circuit to said timer to disconnect said timer and lamps and to simultaneously energize said motor to move said carriage backward, means for raising said platen to an elevated position when said carriage has been moved to its inoperative position, and means controlled by the rearward movement of said carriage to break the motor circuit to stop the carriage close the circuit to reversing relay to change the polarity of said motor so that when the latter is again energized it will move forward to flatten said platen.

ROGER P. LEAVITT.
WILLIAM M. WHITE.

REFERENCES CITED

The following references are of record in the file of this patent:

UNITED STATES PATENTS

| Number | Name | Date |
|---|---|---|
| 846,767 | Webster | Mar. 12, 1907 |
| 1,052,152 | Knig | Feb. 4, 1913 |
| 1,093,509 | Weidner | Apr. 14, 1914 |
| 1,144,014 | Westman | June 22, 1915 |
| 1,332,854 | Oxley | Mar. 2, 1920 |
| 1,414,582 | Roth | May 2, 1922 |
| 1,417,403 | Moninger | May 23, 1922 |
| 2,344,405 | Grover | Mar. 14, 1944 |
| 2,421,150 | Jacobson | May 27, 1947 |